Patented Nov. 22, 1949

2,489,228

UNITED STATES PATENT OFFICE 2,489,228

SHIP PROTECTION

Herbert William Rudd, Buckhurst Hill, England, assignor to Shell Development Company, San Francisco, Calif., a corporation of Delaware No Drawing. Application January 23, 1945, Serial No. 574,219. In Great Britain February 8, 1944

8 Claims. (Cl. 117—161)

This invention relates to anti-fouling compositions for ships and has as an object the provision of a novel method and compositions for protection of ships' bottoms and the like from accumulations of fouling marine accumulations.

Anti-fouling methods and compositions are well known in the paint and shipbuilding trades as paints or pastes which are applied to the hulls of ships to prevent the adherence of marine organisms such as barnacles, mollusks, annelids, algae and other fouling growths which otherwise accumulate to form a tightly adherent layer reducing the speed of the ship. Most of these methods and compositions are based on paint media containing a drying oil and/or a resin, especially common resin or colophony and a volatile solvent and contain as an essential ingredient, some toxic substance, such as mercuric oxide or cuprous oxide, which kills the marine organisms or prevents their adherence.

According to the present invention, ships' bottoms and the like are prevented from accumulating fouling marine organisms by applying thereto an anti-fouling composition comprising a medium consisting of an aqueous emulsion of a film-forming material, such as bitumen, resin or oil-resin mixture and a toxic substance, the aqueous phase of the emulsion being the continuous phase. The emulsion, in addition to the main constituents, (the oil or dispersed phase and the water or continuous phase) contains a water soluble emulsifying agent which remains in the film after removal of the water by drying and is capable of causing the dry film to remain water sensitive; that is, able to absorb water, swell, and even in extreme cases to become slowly re-emulsified. In the compositions used, according to the present invention, the presence of soap and a gel-forming hydrophilic colloid in the emulsifying agent renders the dried paint film sufficiently sensitive to water to cause the paint to disintegrate slowly, thereby liberating the toxic substance contained in said paint and preventing accumulations of fouling organisms.

In the method of the present invention, the above protective aqueous emulsion is applied in any suitable manner to the ships' bottoms or like surface which is exposed to sea water, etc., for example, the emulsion may be brushed or sprayed onto said surfaces which have been properly primed with a suitable anti-corrosive paint. The priming paint is preferably one which contains bitumen, drying oil and/or resin dissolved in a volatile solvent. At least two coats of the anti-fouling paint composition of the present invention are generally required for efficient protection.

As the toxic substance for incorporation in said aqueous emulsion mercuric oxide is preferred. Other toxic substances, such as mercuric sulphide, mercuric thiocyanate, cuprous oxide, copper aceto-arsenite (Paris green), cuprous thiocyanate, organic acid salts and naphthenates of copper, etc., may also be used.

Water-soluble emulsifying agents capable of imparting water sensitivity to the dried paint film include, for example, various soaps such as alkali metal, as well as ammonium soaps of detergent forming acids, such as higher fatty acids, i. e. acids having at least 10 carbon atoms in the molecule, for example, melissic acid, lauric acid, myristic acid, palmitic acid, stearic acid, undecylenic acid, ricinoleic acid, polyricinoleic acid, ricino-stearolic acid, acetyl-recinoleic acid, linoleic acid, linolenic acid, etc.; soaps of mixed higher fatty acids derived from animal, fish or vegetable sources, for example, cocoanut oil, rapeseed oil, palm kernel oil, corn oil, cottonseed oil, teaseed oil, soyabean oil, peanut oil, sardine oil, seal oil, rosin and naturally-occurring resin oils, tall oil, such as, for example, a hard, brittle, dark-colored thermoplastic resin derived from pinewood (as described in Paint Manufacture, January 1936, page 16); and of terpene carboxylic acids, such as abietic acid, etc.; soaps of partially or completely hydrogenated or blown unsaturated animal, fish and vegetable oils; or of naturally-occurring petroleum acids such as naphthenic acids, and carboxy acids produced by the oxidation of petroleum or paraffin wax, etc.; sulphated and sulphonated soaps such as sodium lauryl sulphate, sodium stearyl sulphate, sodium oleyl sulphate, and sodium salts of sulphonated esters of dicarboxylic acids or of sulphonated alkyl benzenes or naphthalenes wherein the alkyl radical has at least 4 carbon atoms; silicic acid (water glass) and its salts with ammonia and alkali metals; hydrophilic colloids such as methyl celullose, polyvinyl alcohol, starch etc.; proteins, such as casein, egg albumin, glue, gelatin, agar, Carragheen (Irish) moss, alginic acid and its salts etc.; the reaction products of casein and alginic acid with salts of ammonia and the alkali metals, salts of calcium magnesium and aluminum, etc., and the reaction products of casein with acids such as lactic acid, etc.; partial esters of hydrocarbon carboxylic acids, such as mentioned above, with polyhydric alcohols such as glycols, glycerol, etc., such as gylcerol monooleate, mononaphthenates, resinates, etc., polyethylene glycol mono-esters, e. g. cocoanut oil, fatty acid partial ester of octa-ethylene glycol, etc.; amine salts, polyalkanol amine soaps, such as triethanolamine soaps; hydrophilic clays such as fuller's earth, bentonite, montmorillonite, kaolin, etc., and the like or combinations and mixtures thereof. Preferably a combination of a gel-forming hydrophilic colloid and a water-soluble soap are used for the best results. In general, one or a mixture of the above emulsifying agents is used in an amount of about 0.05-1.0% or more by weight based on the weight of the final pigmented emulsion, or about 0.1% to 2% by weight based on the dried paint film. For example, preferred compositions contain 0.1 to 0.5% by weight of lactic-casein and 1.0 to 3.0% by weight of 10% solution of a hard, brittle, dark-colored, substantially petroleum-hydrocarbon-insoluble thermoplastic resin derived from pinewood and containing phenol, aldehyde and ether groups, in potassium hydroxide.

The preferred asphaltic bitumen suitable for use in the compositions of the present invention is the relatively light colored material known as albino asphalt. Such albino asphalts can be obtained from most asphalt and mixed based crude oils by solvent extraction and distillation methods such as those set out in U. S. patents of Merrill 2,081,496; Crawley 2,114,796; Anderson 2,291,466; Anderson 2,231,419; and Anderson Reissue 22,093. Albino asphalts are characterized by their plasticity, translucency, freedom from asphaltenes and complete solubility in light naphtha. Other asphalts, although not strictly albino asphalts, may be used if they are of sufficiently light color that they can be pigmented to the extent that they present a light colored surface. In certain instances, although less advantageously, dark or black bitumens may be used. Alternatively, aromatic petroleum extracts may be employed, particularly those obtained from bright stocks. Such extracts are petroleum products of high viscosity which may be liquid or plastic at room temperature and are obtained as extracts in the solvent refining of lubricating oil or as residue from certain crude oils. In many cases, such extracts, for example, Edeleanu extract of heavier oils, are preferred. In some cases, suitable aromatic petroleum residues may be obtained directly by the distillation of such crude oils, for instance from the Sarawak (Miri) oil field, or they may be products of the extraction or distillation of any of the above materials. Aromatic petroleum extracts, such as Edeleanu extract of lubricating oil, dry to hard varnish-like films on exposure to air and those preferred for use in the present invention should dry in 8 to 12 hours in the presence of 0.5% cobalt metal present in the form of an oil soluble cobalt compound, as a siccative. Likewise, oils recovered by hydrolysis of acid sludges and distillation may be used.

Preferably, the aromatic petroleum extracts or albino asphalts are used in combination with other film-forming materials such as preferably phenol-formaldehyde resins, as well as other such materials, or alternatively in conjunction with natural resins such as rosin (colophony) and its esters with polyhydric alcohols (e. g. glycol, glycerol, pentaerythritol, etc.) known as ester gums and other natural resins. It is generally desirable to incorporate into the composition also a siccative, such as cobalt, lead, and manganese naphthenates, linolates, and oxides, etc.

Any suitable pigment may be used to obtain the proper color of the dried film resulting from the application of the aqueous emulsions of the present invention. Such pigments include, for example, chromium oxide green, iron oxide red, yellow ochre, cadmium yellow, umber and other earth colours, ultramarine blue, cobalt blue, titanium oxide, sublimed white lead, zinc oxide, lithopone and mixtures of the foregoing and also any other desired pigment or extender, such as barytes, silica, slate dust, china clay (kaolin) or asbestine. Preferably the pigments are dispersed in water with the aid of a wetting agent and this dispersion then admixed with the aqueous asphalt emulsion. However, it is sometimes desirious to incorporate the pigment in the emulsion by adding the dried pigment to the emulsion and then milling the resultant colored emulsion.

The following examples, in which parts are by weight, illustrate how compositions according to the present invention may be manufactured.

Example I 280 parts of a pale colored bitumen (penetration about 80 at 25° C.) are fluxed with a mixture of 70 parts of raw linseed oil and 70 parts of Bakelite R.1084a phenol-formaldehyde condensation resin (a phenolic resin of the non-heat reactive type) previously incorporated by heating at 290° C. for a short time, and 4 parts of added cobalt naphthenate containing 12% of cobalt. The mixture is heated to 140° C. and is then emulsified by pouring it into a colloid mill together with a solution containing 7 parts of lactic-casein, 3.5 parts of gelatine, 0.5 part of potassium hydroxide, 50 parts of a 10% solution of common resin (colophony) in potassium hydroxide and 290 parts of water heated to 35° C.

The emulsion is pigmented and provided with its toxic constituents to give an anti-fouling paint as follows:

336 parts of zinc oxide, 336 parts of yellow ochre and 224 parts of mercuric oxide are ground together to a thin paste with 900 parts of water and 1000 parts of the above emulsion are added to this paste with adequate stirring.

Example II 300 parts of an aromatic petroleum residue and 100 parts of a 100% phenolic resin are incorporated by heating at 160 to 200° C., 6 parts of cobalt naphthenate (containing 12% of cobalt) are added to the mixture cooled to 150° C. whereafter it is emulsified by pouring into a colloid mill together with a solution containing 2.8 parts of lactic-casein, 8.4 parts of powdered glue, 0.35 part of potassium hydroxide, 26 parts of 10% solution of a hard, brittle, dark-colored, substantially petroleum-hydrocarbon-insoluble thermoplastic resin derived from pinewood and containing phenol, aldehyde and ether groups, in potassium hydroxide, and 245 parts of water, heated to 50° C. The emulsion is pigmented by thoroughly incorporating a paste consisting of 300 parts of cuprous oxide, 150 parts of red oxide of iron and 150 parts of barytes ground in 530 parts of a 1% solution of Carragheen moss.

Example III 216 parts of linseed stand oil (sp. gr. 0.96) and 108 parts of refined linseed oil are mixed with 162 parts of Bakelite R. 11111 phenol-formaldehyde condensation resin and 16 parts of rosin, and heated with stirring to a temperature of 150° C. till homogeneous; 1¼ parts of cobalt naphthenate are then added (containing 12% of cobalt) and the hot varnish emulsified by pouring into a colloid mill together with a solution containing 2.8 parts of lactic casein, 8.4 parts of gelatine, 0.35 part of potassium hydroxide, 37 parts of a 10% solution of a hard, brittle, dark-colored, substantially petroleum-hydrocarbon-insoluble thermoplastic resin derived from pinewood and containing phenol, aldehyde and ether groups, in potassium hydroxide, and 340 parts of water heated to 35° C. The emulsion is pigmented by adding a paste 330 parts of copper powder and 184 parts of iron oxide in 415 parts of water.

*Example IV*

300 parts of aromatic petroleum residue and 100 parts of common rosin are mixed with 8 parts of cobalt naphthenate containing 12% of cobalt at a temperature of 150° C. This mixture is then emulsified as described above by pouring into a solution of 2.9 parts of methyl cellulose, 8.7 parts of gelatine and 27 parts of a 10% solution of a hard, brittle, dark-colored, substantially petroleum-hydrocarbon-insoluble thermoplastic resin derived from pinewood and containing phenol, aldehyde and ether groups, in potassium hydroxide, all dissolved in 260 parts of water and heated to 35° C. The emulsion is pigmented by stirring in a paste containing 315 parts of cuprous oxide, 235 parts of iron oxide and 78 parts of bentonite in 1100 parts of water.

*Example V*

300 parts of aromatic petroleum residue, 100 parts of ester gum and 6 parts of cobalt naphthenate mixed as in Example IV are emulsified in a solution of 8.6 parts of glue, 2.9 parts of Carragheen moss and 27 parts of a 10% solution of a hard, brittle, dark-colored, substantially petroleum-hydrocarbon-insoluble thermoplastic resin derived from pinewood and containing phenol, aldehyde and ether groups, and potassium hydroxide, all in 25 parts of water. This emulsion is pigmented as described in Example I.

In an experiment which demonstrates the advantages of my invention, plaques were coated with anti-fouling paints as follows:

(a) An anti-fouling paint having as a binding medium the following mixture:

| | Grams |
|---|---|
| Edeleanu extract | 100 |
| Phenol-formaldehyde condensation resin Bakelite R. 10840 | 50 |
| Cobalt naphthenate (containing 12% of cobalt) | 2.25 | this binder being pigmented with:

| | Grams |
|---|---|
| Zinc oxide | 37.5 |
| Ferric oxide | 37.5 |
| Mercuric oxide | 75 | the whole being thinned with:

| | C. c. |
|---|---|
| Solvent naphtha | 70 |
| White mineral spirit | 28 |

(b) An anti-fouling paint having the above binding medium, pigmented as before, but the whole emulsified in a solution containing lactic-casein, gelatine, potassium hydroxide and a soap of a hard, dark-colored, substantially petroleum-hydrocarbon-insoluble, thermoplastic resin derived from pinewood and containing phenol, aldehyde and ether groups in the proportions described in Example I above.

These plaques were placed in seawater in the Thames Estuary for a period of two months, at the end of which time the plaques coated with the varnish base paint, formula *a* above, exhibited serious fouling, whereas those coated with the emulsion base paint, formula *b* above, were completely free from fouling.

The invention is not limited by the bitumen, oils, or resins used in the above examples and the relative parts by weight of the ingredients may be varied if desired. The emulsifying agent can also be varied if desired by using other substances of a hydrophilic nature instead of those mentioned above.

I claim as my invention:

1. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a water-insoluble organic film-forming material selected from the group consisting of a film-forming bitumen, a film-forming aromatic petroleum residue, a film-forming aromatic hydrocarbon extract from petroleum, a film-forming resin, and mixtures thereof, and a toxic substance possessing toxicity toward said marine organisms, said combination-emulsifying agent having a property of remaining in a film deposited from said emulsion after removal of water therefrom upon drying and upon later contact with sea water, said combination-emulsifying agent being capable in the resultant dry film of imparting to same an ability to absorb water on later contact therewith, to then swell, and to become slowly re-emulsified, thereby slowly liberating said toxic substance and preventing accumulation of said fouling organisms.

2. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and an alkali metal water-soluble soap, a continuous aqueous phase having dispersed therein a water-insoluble organic film-forming material selected from the group consisting of a film-forming bitumen, a film-forming aromatic petroleum residue, a film-forming aromatic hydrocarbon extract from petroleum, a film-forming resin and mixtures thereof, and a toxic substance possessing toxicity toward said marine organisms, said combination-emulsifying agent being capable of imparting water-sensitivity to a dried film resulting from drying said aqueous emulsion.

3. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a film-forming bitumen, and a toxic substance possessing toxicity toward said marine organisms, said combination-emulsifying agent being capable of imparting water-sensitivity to a dried film resulting from drying said aqueous emulsion.

4. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a film-forming aromatic petroleum residue, and a toxic substance possessing toxicity toward said marine organisms, said combination-emulsifying agent being capable of imparting water-sensivity to a dried film resulting from drying said aqueous emulsion.

5. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a film-forming aromatic hydrocarbon extract from petroleum obtained in solvent refining of petroleum fractions heavier than gasoline, and a toxic substance possessing toxicity toward said marine organisms, said combination-emulsifying agent being capable of imparting water-sensitivity to a dried film resulting from drying said aqueous emulsion.

6. The method of protecting ships' bottoms and the like from accumulating fouling marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a film-forming Edeleanu extract of lubricating oil stock, and a toxic substance possessing toxicity toward said marine organisms, said combination-emulsifying agent being capable of imparting water-sensivity to a dried film resulting from drying said aqueous emulsion.

7. The method of protecting ships' bottoms and the like from accumulating marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a combination of a film-forming aromatic hydrocarbon extract from petroleum and a phenol-formaldehyde resin compatible therewith, and a toxic substance possessing toxicity toward said marine organisms, said combination-emulsifying agent having a property of remaining in a film deposited from said emulsion after removal of water therefrom upon drying and upon later contact with sea water, said combination-emulsifying agent being capable in the resultant dry film of imparting to same an ability to absorb water on later contact therewith, to then swell, and to become slowly re-emulsified, thereby slowly liberating said toxic substance and preventing accumulation of said fouling organisms.

8. The method of protecting ships' bottoms and the like from accumulating marine organisms under conditions of later contact with sea water, which method comprises applying to said ships' bottoms a composition consisting essentially of an aqueous emulsion paint having a combination-emulsifying agent consisting of a gel-forming hydrophilic colloid and a water-soluble alkali metal soap, a continuous aqueous phase having dispersed therein a combination of a film-forming aromatic hydrocarbon extract from petroleum and a phenol-formaldehyde resin compatible therewith, and a toxic substance possessing toxicity toward said marine organisms, said combination-emulsifying agent being capable of imparting water-sensitivity to a dried film resulting from said aqueous emulsion.

HERBERT WILLIAM RUDD.

REFERENCES CITED

The following references are of record in the file of this patent:

UNITED STATES PATENTS

| Number | Name | Date |
|---|---|---|
| 1,733,493 | Kirschbraun | Oct. 29, 1929 |
| 1,988,175 | Merrill | Jan. 15, 1935 |
| 2,190,604 | Montgomerie et al. | Feb. 13, 1940 |
| 2,256,886 | Buckley | Sept. 23, 1941 |
| 2,326,610 | Borglin | Aug. 10, 1943 |
| 2,364,460 | McLean | Dec. 5, 1944 |
| 2,382,337 | Schiller | Aug. 14, 1945 |

FOREIGN PATENTS

| Number | Country | Date |
|---|---|---|
| 381,286 | Great Britain | Oct. 6, 1932 |
| 514,818 | Great Britain | Nov. 17, 1939 |
| 111,955 | Australia | Nov. 28, 1940 |

OTHER REFERENCES

Scientific Section, Paint Manufacturers Assoc., Circular No. 259, Jan. 1926., H. A. Gardner, page 240.